United States Patent [19]

Izuno

[11] Patent Number: 5,023,760
[45] Date of Patent: Jun. 11, 1991

[54] RETRACTABLE TURN SIGNAL ASSEMBLY FOR TRUCKS

[75] Inventor: Herb Izuno, Fremont, Calif.
[73] Assignee: Paccar Inc., Bellevue, Wash.
[21] Appl. No.: 398,635
[22] Filed: Aug. 25, 1989
[51] Int. Cl.$^5$ ............................................. B60Q 1/076
[52] U.S. Cl. ....................................... 362/66; 362/70; 362/80
[58] Field of Search ...................... 362/61, 66, 70, 71, 362/80; 340/465, 468, 482, 484, 475

[56] References Cited

U.S. PATENT DOCUMENTS

| | | | |
|---|---|---|---|
| 2,155,617 | 4/1939 | Roan et al. | 340/487 |
| 4,320,441 | 3/1982 | Matsushiro | 362/70 |
| 4,471,410 | 9/1984 | Nakano | 362/70 |
| 4,821,155 | 4/1989 | Harting | 362/70 |
| 4,855,878 | 8/1989 | Vu et al. | 362/66 |

FOREIGN PATENT DOCUMENTS

| | | | |
|---|---|---|---|
| 1812636 | 6/1970 | Fed. Rep. of Germany | 362/66 |
| 571642 | 2/1945 | United Kingdom | 362/66 |

*Primary Examiner*—Ira S. Lazarus
*Assistant Examiner*—Sue Hagarman
*Attorney, Agent, or Firm*—Flehr, Hohbach, Test, Albritton & Herbert

[57] ABSTRACT

A turn signal assembly for use on trucks wherein the turn signal is normally in a retracted position flush with the side of the truck and upon activation is transposed to an extended position protruding from the side of the truck such that the turn signal is visible to adjacent vehicles.

10 Claims, 2 Drawing Sheets

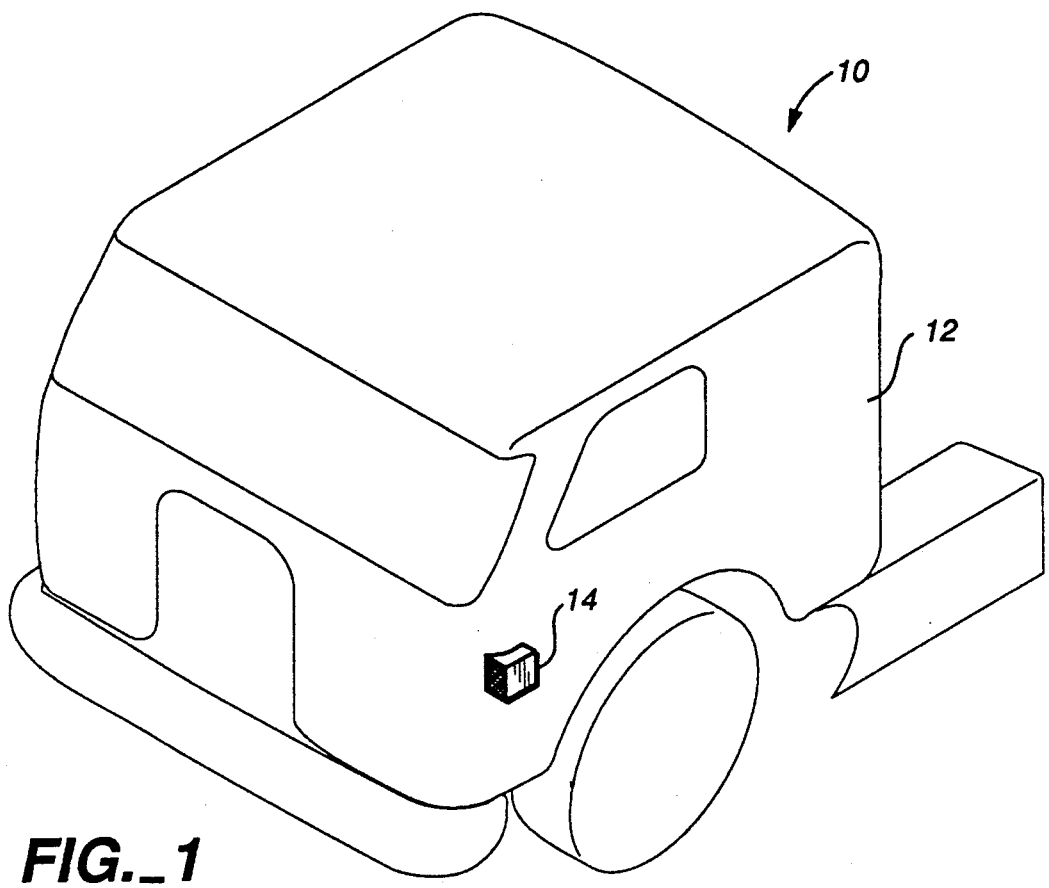
FIG._1
*(PRIOR ART)*
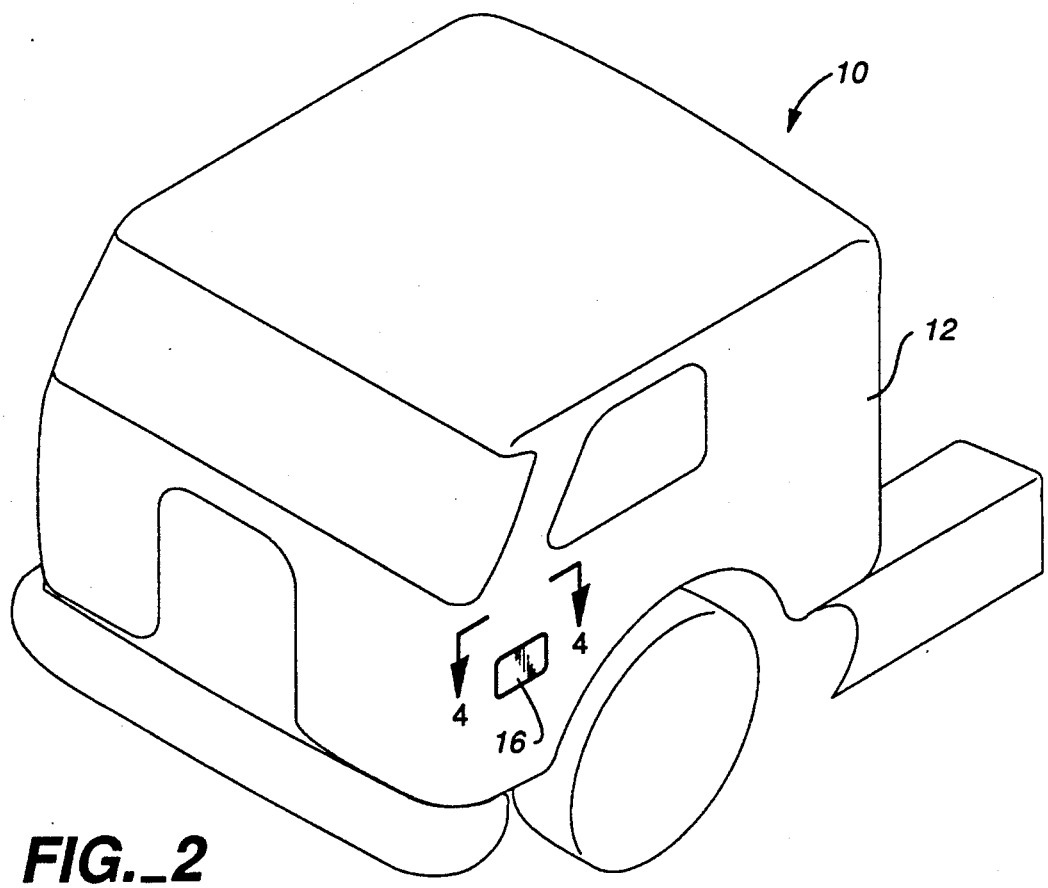
FIG._2

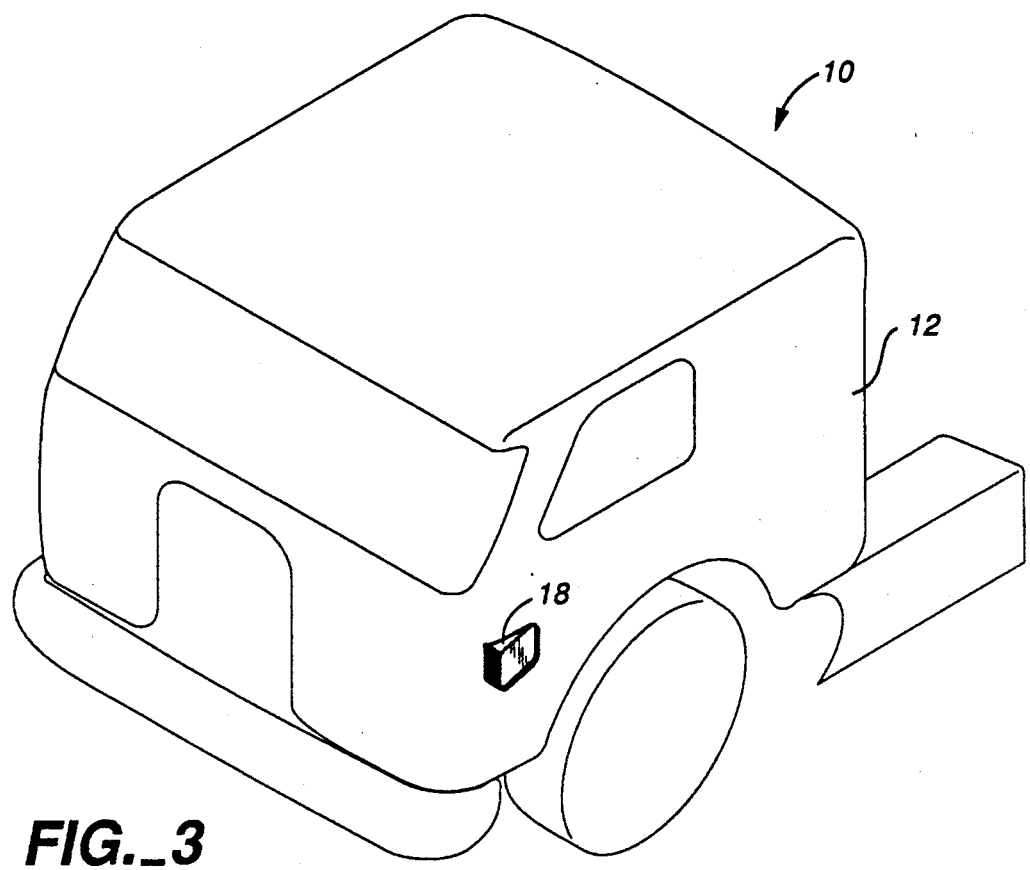
FIG._3
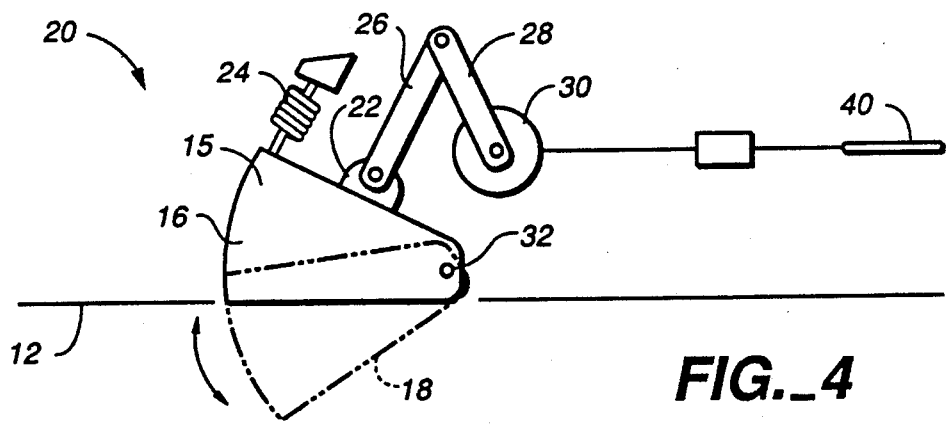
FIG._4
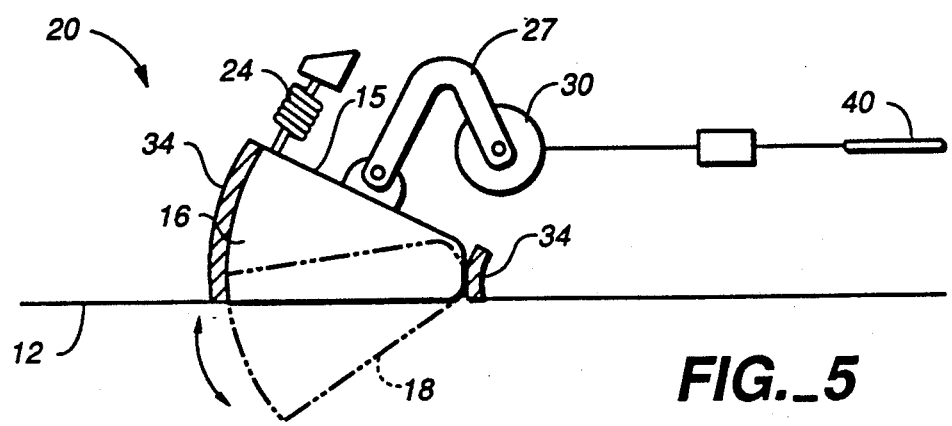
FIG._5

RETRACTABLE TURN SIGNAL ASSEMBLY FOR TRUCKS

BRIEF DESCRIPTION OF THE INVENTION

This invention relates to a retractable turn signal assembly for trucks. More particularly, it relates to a turn signal assembly for use on trucks wherein the turn signal is normally in a retracted position flush with the side of the truck and upon activation is transposed to an extended position protruding from the side of the truck such that the turn signal is visible to adjacent vehicles.

BACKGROUND OF THE INVENTION

A car, van, or smaller truck has its turn signals formed flush to the body of the vehicle. The turn signals on these vehicles provide warning to adjacent vehicles of an impending turn or other change of direction. A turn signal formed flush to the body of a large truck, however, will not necessarily provide sufficient warning to adjacent vehicles. For instance, if a vehicle is positioned at the side of a truck's trailer, a turn signal flush to the truck body will not be visible to that vehicle which may be thirty feet behind the signal. Consequently, many operators of large trucks demand turn signals which protrude from the body of the truck.

As a result of this need for protruding turn signals, a number of problems arise. First, the protruding turn signal is susceptible to collision with adjacent objects. Since the turn signal is positioned beneath the driver's line of sight, the driver is unlikely to notice an impending collision between the turn signal and an adjacent object. Consequently, the driver cannot maneuver to avoid the collision. Moreover, unlike a protruding side mirror which is retractable and thus withstands collisions, turn signals shatter upon impact and thus must be replaced at considerable expense.

Another problem associated with protruding turn signals relates to the additional drag created by these bodies. The extending turn signals add to the total frontal area of the truck, which multiplied by the appropriate drag coefficient, provides an indication of the aerodynamic efficiency of the vehicle. Aerodynamic efficiency exercises an important role in determining fuel economy of a vehicle. A final problem associated with protruding turn signals relates to aesthetics. The awkward, extending turn signals are simply unsightly.

OBJECTS AND SUMMARY OF THE INVENTION

It is a general object of the present invention to provide a retractable turn signal for a truck.

It is another object of the present invention to provide a turn signal with diminished susceptibility to destruction from exposure to objects adjacent to the truck.

Another object of the present invention is to provide a turn signal which is more aesthetically pleasing than what has heretofore been known in the art.

It is still another object of the invention to improve the aerodynamic efficiency of a truck.

These and other objects are achieved by a turn signal assembly for use in the side of a truck. The assembly includes a turn signal, in other words, a light source, which is normally in a retracted position flush with the side of the truck. The assembly also includes a switch which is activated by the truck operator when it is desired to indicate a change of direction. Once activated, the switch drives signal assembly components in such a manner that the light source is moved from its retracted position to an extended position, wherein it visibly protrudes from the side of the truck.

BRIEF DESCRIPTION OF THE DRAWINGS

Other objects and advantages of the invention will become apparent upon reading the following detailed description and upon reference to the drawings, in which:

FIG. 1 is a perspective view of a truck with its turn signal extending from the side of the truck, in accordance with the prior art.

FIG. 2 is a perspective view of a truck, in accordance with the present invention, with its turn signal in a retracted position, flush to the side of the truck.

FIG. 3 is a perspective view of a truck, in accordance with the present invention, with its turn signal in an extended position, protruding from the side of the truck.

FIG. 4 is a cross-sectional view looking down along the line 4—4 in FIG. 2, depicting one embodiment of the turn signal assembly of the present invention.

FIG. 5 is a top view looking down along the line 4—4 in FIG. 2, depicting another embodiment of the turn signal assembly of the present invention.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Referring to FIG. 1, wherein like components are designated by like reference numerals in the various figures, a prior art truck 10 is depicted. The truck's side 12 includes a protruding turn signal 14. Of course, an identical turn signal would appear on the opposite side of the truck. As can be appreciated by viewing FIG. 1, in the prior art, the protruding turn signal will continually create air turbulence since it extends from the body of the truck. As a result, the aerodynamic efficiency of the vehicle is diminished. Moreover, since it is positioned beneath the driver's line of sight, the driver will not recognize when the protruding turn signal is in danger of colliding with adjacent objects. Therefore the truck cannot be manipulated to avoid collision with such objects. Finally, as an aesthetic matter, the prior art turn signal is rather awkward in appearance.

In FIG. 2, the turn signal assembly of the present invention is depicted. In FIG. 4, the assembly is generally indicated by the reference numeral 20. Returning to FIG. 2, the turn signal is in its retracted position 16 (and retracted position 16' on the trailer 11). As can be seen, in this position, the turn signal does not represent an aerodynamic obstruction. Similarly, it is not susceptible to destruction. Finally, being flush to the body of the vehicle, it is aesthetically pleasing.

Referring now to FIG. 3, the turn signal of the present invention is depicted in its extended, or protruding, position 18 (and protruding position 18' on the trailer 11). In this position, the turn signal performs its customary function of alerting adjacent drivers of a change of direction.

FIG. 4 depicts the turn signal assembly 20 in its entirety. The view is a cross-section viewed from above the assembly, along the line 4—4 of FIG. 2. Its turn signal 15 is shown, in solid lines, in its retracted position 16 and it is shown, in dotted lines, in its extended position 18. As depicted, when the turn signal 15 is in the retracted position 16 it is substantially flush with the side of the truck 12. Conversely, when the turn signal 15 is in its extended position 18, it is protruding from the side of the truck 12.

As is well-known in the art, the turn signal 15 is simply a light source within a housing. The shape of the turn signal is without particular significance. However, in a preferable embodiment, the turn signal includes a flange 22.

In a preferable embodiment, the turn signal 15 is maintained in its retracted position 16 by a biasing spring 24. When the turn signal assembly is activated, a motor, to be described herein, pushes the turn signal 15 and the spring 24 to an extended position, as to be more fully described at this time.

FIG. 4 depicts a transposition mechanism for moving the turn signal 15 from its retracted position 16 to its extended position 18. In this embodiment, a first lever 26 is attached to the flange 22 of the turn signal 15. The other end of the first lever is attached to one end of a second lever 28. The other end of the second lever 28 is attached to a motor or solenoid 30. The motor or solenoid, in turn, is electrically connected to a switch 40 which is positioned within the truck. Such a switch may be the turn signal lever adjacent the steering wheel, as is well known in the art.

When the switch 40 is activated the motor or solenoid 30 is energized and drives the second lever 28 in a direction toward the side of the truck 12. This force is transferred to the first lever 26 which overcomes the biasing force of the spring 24 to position the turn signal 15 in its extended position 18. In the embodiment of FIG. 4, the turn signal 15 simply pivots about pivot pin 32. When the switch 40 is manually deactivated by the operator, or through other conventional means, the motor or solenoid will de-energize and the spring 24 will again bias the turn signal 15 in its retracted position 16.

Another embodiment of the present invention is disclosed in FIG. 5. All of the components of FIG. 4, and their respective functions, are present in FIG. 5, with the exception of the first lever 26, the second lever 28 and the pivot pin 32. In this embodiment, the first and second levers have been replaced by a single bent arm 27. The bent arm 27 is driven by the motor or solenoid 30 in the same manner and for the same purpose as heretofore described. In this embodiment, the turn signal does not move about a pivot pin, rather its motion is directed by a track assembly 34. The track assembly 34 supports the turn signal 15 and guides it from its retracted position 16 to its extended position 18.

Thus, it is apparent that there has been provided, in accordance with the invention, a turn signal assembly that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and scope of the appended claims.

What is claimed is:

1. A turn signal assembly specifically configured for use in a side of a highway truck, said assembly, comprising:
   light means having a front end with a front-facing surface for projecting illumination in a forward direction with respect to said truck, when in an extended position, said light means producing blinking illumination in said extended position;
   means supporting said light means for movement between a normally retracted position at least flush with said side of said truck and said extended position with said front end and said front-facing surface protruding outwardly by a distance sufficient for illumination from said front-facing surface in a forward direction, and said front-facing surface sloping rearwardly from said side of said truck in said extended position,
   means for moving said light means between said retracted and extended positions; and
   activation means for causing said moving means to move said light means to said extended position upon designation of said activation means by an operator, said light means being in said retracted position when said activation means is not designated.

2. A turn signal assembly as in claim 1 wherein said means for supporting said light means includes a pin serving as a pivot at one end of said light means.

3. A turn signal assembly as in claim 1 wherein said means for supporting said light means includes a track assembly for engaging the sides of said light means.

4. A turn signal assembly as in claim 1 wherein said means for moving said light means includes cooperating levers and a motor wherein said motor drives said cooperating levers from said retracted to said extended positions.

5. A turn signal assembly as in claim 4 wherein said light means includes a flanged member on its interior side, said levers including first and second levers, wherein said flange is connected to an end of said first lever, said first lever being connected at its opposite end to an end of said second lever, said second lever being connected at its opposite end to said motor, said motor driving said second lever arm which drives said first lever arm, whereby said light means being connected by said flanged member to said first lever arm is forced from said retracted position to said extended position.

6. A turn signal assembly as in claim 1 wherein said means for moving said light means includes a curved arm and a motor, and wherein said light means includes a flanged member on its interior side, wherein one end of said arm is attached to said flanged member and the other end of said arm is attached to said motor, said motor driving said arm so as to force said light means from said retracted position to said extended position.

7. A turn signal assembly as in claims 4 or 6 wherein said means for moving said light means further includes a spring for biasing said light means in said retracted position.

8. A turn signal assembly as in claims 4 or 6 wherein said means for moving said light means further includes means for operating said motor between energized and de-energized states.

9. A turn signal assembly as in claim 8 wherein said means for operating said motor includes a manually operated turn signal lever for use by a truck driver.

10. A turn signal assembly as in claim 1 wherein said assembly is positioned beneath the line of sight of a driver of said truck.

* * * * *